United States Patent
Hugener-Campbell et al.

(10) Patent No.: US 8,617,478 B2
(45) Date of Patent: Dec. 31, 2013

(54) PHOTOCATALYTIC DEVICE WITH MIXED PHOTOCATALYST/SILICA STRUCTURE

(75) Inventors: Treese Hugener-Campbell, Coventry, CT (US); David F. Ollis, Chapel Hill, NC (US); Thomas Henry Vanderspurt, Glastonbury, CT (US); Wayde R. Schmidt, Pomfret Center, CT (US); Timothy N. Obee, South Windsor, CT (US); Stephen O. Hay, Tolland, CT (US); Michael A. Kryzman, West Hartford, CT (US)

(73) Assignee: Carrier Corporation, Farmington, CT (US)

( * ) Notice: Subject to any disclaimer, the term of this patent is extended or adjusted under 35 U.S.C. 154(b) by 177 days.

(21) Appl. No.: 12/850,105

(22) Filed: Aug. 4, 2010

(65) Prior Publication Data

US 2011/0027138 A1 Feb. 3, 2011

Related U.S. Application Data

(63) Continuation of application No. PCT/US2009/039323, filed on Apr. 2, 2009.

(60) Provisional application No. 61/123,131, filed on Apr. 4, 2008.

(51) Int. Cl.
*B01J 19/08* (2006.01)

(52) U.S. Cl.
USPC .................................. 422/186.04

(58) Field of Classification Search
USPC ................. 422/186.3, 121, 186.04
See application file for complete search history.

(56) References Cited

U.S. PATENT DOCUMENTS

| | | | |
|---|---|---|---|
| 5,736,055 A * | 4/1998 | Cooper | 210/748.1 |
| 6,362,121 B1 * | 3/2002 | Chopin et al. | 502/2 |
| 7,255,831 B2 | 8/2007 | Wei et al. | |
| 7,927,554 B2 * | 4/2011 | Morrow et al. | 422/186.3 |
| 2005/0042375 A1 | 2/2005 | Minami et al. | |
| 2006/0194037 A1 | 8/2006 | Fink et al. | |
| 2007/0119344 A1 | 5/2007 | Yeung et al. | |
| 2007/0218264 A1 | 9/2007 | Gueneau et al. | |
| 2009/0185966 A1 | 7/2009 | Hugener-Campbell et al. | |

FOREIGN PATENT DOCUMENTS

CN 1832793 A 9/2006
(Continued)

OTHER PUBLICATIONS

Kun et al., "Photooxidation of organic dye molecules on TIO2 and zinc-aluminum layered double hydroxide ultrathin layers", Colloids and Surfaces A: Physicochem. Eng. Aspects 265 (2005) 155-162.*
International Search Report, PCT/US2009/039323, mailed Jan. 7, 2010, 7 pages.

(Continued)

*Primary Examiner* — Kishor Mayekar
(74) *Attorney, Agent, or Firm* — Cantor Colburn LLP

(57) ABSTRACT

A catalytic device comprises a mixed structure of photocatalyst and silica. The mixed structure may be comprised of alternating layers of photocatalyst and silica, a layer having a uniform mixture of photocatalyst particles and silica particles, or a layer having a graded mixture of photocatalyst particles and silica particles.

5 Claims, 3 Drawing Sheets

(56) References Cited

FOREIGN PATENT DOCUMENTS

| | | |
|---|---|---|
| DE | 19905546 A1 | 8/1999 |
| EP | 0978494 A1 | 2/2000 |
| JP | 2000239047 A | 9/2000 |
| JP | 2001129412 A | 5/2001 |
| JP | 2006021494 A | 1/2006 |
| KR | 1999026277 A | 4/1999 |
| KR | 200178823 Y1 | 4/2000 |
| WO | WO2007143013 A1 | 12/2007 |

OTHER PUBLICATIONS

International Written Opinion, PCT/US2009/039323, mailed Jan. 7, 2010, 4 pages.
The Extended European Search Report for International Application No. PCT/EP2009/039323 dated Jun. 26, 2012, 7 pages.
Extended EP Search Report of the European Patent Office in counterpart foreign Application No. 07809253.3 dated Dec. 2, 2011, including machine translation of JP2001129412A, 24 pages.

* cited by examiner

PHOTOCATALYTIC DEVICE WITH MIXED PHOTOCATALYST/SILICA STRUCTURE

CROSS REFERENCE TO RELATED APPLICATIONS

This application is a continuation of International Application No. PCT/US2009/039323 filed Apr. 2, 2009, the entire contents of which are incorporated herein by reference, which claims priority to U.S. Provisional Application No. 61/123,131 filed Apr. 4, 2008, the entire contents of which are incorporated herein by reference.

FIELD OF THE INVENTION

This invention relates generally to the field of photocatalysts. More specifically, the present invention relates to a device for decreasing deactivation in photocatalysts in air purification systems using ultraviolet photocatalytic oxidation (UV-PCO) technology.

BACKGROUND

Some buildings utilize air purification systems to remove airborne substances such as benzene, formaldehyde, and other contaminants from the air supply. Some of these purification systems include photocatalytic reactors that utilize a substrate or cartridge containing a photocatalyst oxide. When placed under an appropriate light source, typically a UV light source, the photocatalyst oxide interacts with airborne water molecules to form hydroxyl radicals or other active species. The hydroxyl radicals then attack the contaminants and initiate an oxidation reaction that converts the contaminants into less harmful compounds, such as water and carbon dioxide. It is further believed that the combination of water vapor, suitably energetic photons, and a photocatalyst also generates an active oxygen agent like hydrogen peroxide as suggested by W. Kubo and T. Tatsuma, 20 Analytical Sciences 591-93 (2004).

A commonly used UV photocatalyst is titanium dioxide ($TiO_2$), otherwise referred to as titania. Degussa P25 titania and tungsten dioxide grafted titania catalysts (such as tungsten oxide on P25) have been found to be especially effective at removing organic contaminants under UV light sources. See, U.S. Pat. No. 7,255,831 "Tungsten Oxide/Titanium Dioxide Photocatalyst for Improving Indoor Air Quality" by Wei et al.

A problem with air purification systems using UV-PCO technology has arisen. Currently available systems exhibit a significant loss in catalytic ability over time. This loss of catalytic ability has been at least partially attributed to volatile silicon-containing compounds (VSCCs), such as certain siloxanes, present in the air.

The aggregate amount of volatile organic compounds (VOCs) in air is typically on the order of 1 part per million by volume. In contrast, VSCC concentrations are typically two or more orders of magnitude lower. These VSCCs arise primarily from the use of certain personal care products, such as deodorants, shampoos and the like, or certain cleaning products or dry cleaning fluids, although they can also arise from the use of room temperature vulcanizing (RTV) silicone caulks, adhesives, lubricants, and the like. When these silicon-containing compounds are oxidized on the photocatalyst of a UV-PCO system, they form relatively non-volatile compounds containing silicon and oxygen that may deactivate the photocatalyst. Examples of non-volatile compounds of silicon and oxygen include silicon dioxide, silicon oxide hydroxide, silicon hydroxide, high order polysiloxanes, and the like. These compounds may be at least partially hydrated or hydroxylated when water vapor is present. Increasing the catalyst surface area alone does not necessarily slow the rate of deactivation as might be expected if the deactivation occurred by direct physical blockage of the active sites by the resultant non-volatile compound containing silicon and oxygen.

There is a need for improved UV-PCO systems that can aid in the elimination of fluid borne contaminants in a fluid purifier and can operate effectively in the presence of typically encountered levels of VSCCs such as siloxanes.

Literature data indicates that $TiO_2$ and ZnO can generate gaseous oxidants, possibly hydroxyl radicals (.OH) and hydrogen peroxide radicals (.OOH), but most likely hydrogen peroxide ($H_2O_2$). These volatile oxidants can travel up to 100-500 μm and be converted, if necessary, to .OH by $H_2O_2$ photolysis. The resulting now hydroxyl species, generated at some distance from the original $TiO_2$ photocatalyst surface, can oxidatively destroy organic compounds or films which are not in contact with $TiO_2$, hence the name "remote" photocatalyzed oxidation. Example film materials oxidized include palmitic acid multilayers, soot particles, and absorbed organic dyes (methylene blue).

Such remote oxidation has recently been demonstrated for organo-silicon compounds including octadecyl-triethoxysilane (ODS), (Tatsuma et al. (2002)) and related silanes: heptadecafluoro-decatrimethoxysilane, octodecyltriethoxysilane, and methyltriethoxysilane. Presumptively, such Si-containing compounds will leave a silica ($SiO_2$) residue, which is expected to be similar to the "silica" produced by photocatalysts due to adsorption and degradation of organo-siloxanes from cosmetic products, etc.

SUMMARY

A catalytic device comprising a mixed structure of photocatalyst and silica is disclosed. The mixed structure may be formed by alternating layers of photocatalyst and silica on a substrate. In an alternative embodiment, a mixed structure is formed by applying a layer having a mixture of photocatalyst particles and silica particles or a layer having a graded mixture of photocatalyst particles and silica particles to a substrate.

DETAILED DESCRIPTION

Figure 1:
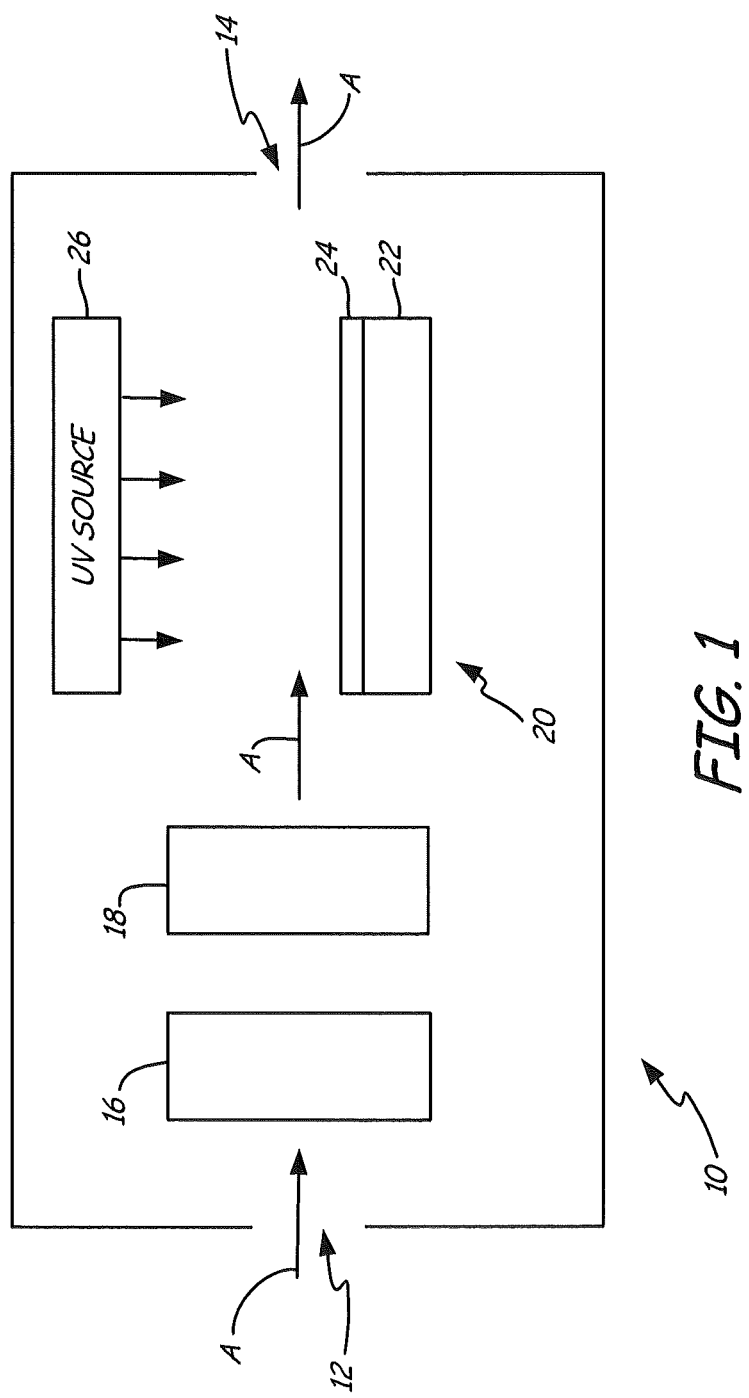
FIG. 1 is a schematic diagram of an ultraviolet photocatalytic oxidation air purification system.

FIG. 1 is a schematic diagram of an ultraviolet photocatalytic oxidation air purification system 10 which includes inlet 12, outlet 14, prefilter 16, VSCC filter 18, and photocatalytic reactor 20 (which includes substrate 22, catalytic coating 24, and UV source 26).

Ambient air is drawn into system 10 through inlet 12. Airstream A passes through prefilter 16 and VSCC filter 18, and then through photocatalytic reactor 20 to outlet 14. Prefilter 16 removes dust and particles by trapping the particles and dust. VSCC filter 18 removes volatile silicon containing compounds (VSCCs) so that they do not reach photocatalyst coating 24 and degrade performance of photocatalytic reactor 18.

When exposed to UV radiation from UV source 26, a catalytic coating 24 containing a photocatalyst interacts with airborne water molecules to produce reactive species such as hydroxyl radicals, hydrogen peroxide, hydrogen peroxide radicals, and superoxide ions. These reactive species interact with VOCs in the air to transform the VOCs into products such as carbon dioxide and water. Therefore, airstream A contains less contaminants as it exits system 10 through outlet 14 than it contained when entering system 10 through inlet 12.

In FIG. 1, substrate 22 is depicted schematically as a flat plate. In practice, substrate 22 can take a number of different forms, which may be configured to maximize surface area on which catalytic coating 24 is located or to maximize the extent of non-laminar (e.g. turbulent) flow through the substrate. Porous substrates may be used such as honeycombs, segmented and radially offset arrays of discrete honeycomb structures, wire meshes, screens, corrugated or perforated structures, woven structures, non-woven structures, felts, and fabrics. The substrate also may be a mixture of materials.

Catalyst coating 24 is comprised of a mixture of silica particles and photocatalyst particles. The silica traps VSCCs in the air, at least temporarily, and may allow these molecules to be oxidized remotely by active species created on the photocatalyst surface. Examples of active species include hydroxyl radicals, hydrogen peroxide, hydrogen peroxide radicals, superoxide ion, or other active oxygen species. In one example, the photocatalyst particles are nanoengineered porous photocatalyst particles containing crystallites and pores. The nanoengineered photocatalyst particles may have a diameter of about 100 nm and a cluster of photocatalyst particles may have a diameter on the order of about 1 micron to about 2 microns. The crystallite may, for example, range from about 3 nm to about 25 nm in diameter and the pores may, for example, be about 4 nm or greater in diameter. Nanoengineered photocatalyst particles are described in greater detail in the PCT application entitled "DEACTIVATION RESISTANT PHOTOCATALYST AND METHOD OF PREPARING," International application number PCT/US07/12882, which is fully incorporated by reference herein and referenced above. In one example, the specific surface area of the nanoengineered photocatalyst is about 50 m$^2$/gram or greater. The particle size of silica is about 7 nm and may aggregate to form particles as large as about 40 nm. The silica has a nominal specific surface area of about 350 to about 420 m$^2$/gram. Non limiting example silicas are available from Alfa Aesar (amorphous fumed silica) and Degussa (Aerosil 380 silica).

Previously, an overlayer of silica was applied to a photocatalyst to decrease catalytic deactivation. See the PCT application entitled "PREPARATION AND MANUFACTURE OF AN OVERLAYER FOR DEACTIVATION RESISTANT PHOTOCATALYSTS," publication number WO2007143013, referred to above and fully incorporated by reference herein. The silica overlayer trapped VSCCs, at least temporarily, and may have allowed these molecules to be oxidized remotely by active species, such as hydroxyl radicals, hydrogen peroxide, hydrogen peroxide radicals, superoxide ion, or other active oxygen species, created on the photocatalytic surface. However, even silica compositions with the same surface area rating (e.g. two silica compositions from different manufacturers both with a surface area rating of 350 m$^2$/gram) and applied with the same loading over a photocatalyst result in different photocatalyst efficiencies because the silica may contain large silica agglomerates. When light from UV source 26 hits these agglomerates, the light scatters, less light is delivered to the photocatalyst particles, and the efficiency of the photocatalyst in catalyst coating 24 is reduced. By controlling the ratio of silica and photocatalyst particles, the size of the silica particles in catalyst coating 24 can be controlled. For example, the efficiency of the photocatalyst can be optimized by controlling the size of the silica particles so that the silica particles are small enough that UV light will penetrate through the particles and reach the photocatalyst particles.

In one embodiment, as illustrated in FIG. 1, photocatalyst particles, such as a photocatalyst powder, and silica particles, such as silica powder, are physically mixed together and applied to substrate 22 so that catalyst coating 24 has a uniform silica to photocatalyst ratio throughout. In one example, silica is present in the mixture from about 5% to about 50% by volume with the balance of the mixture containing photocatalyst and porosity, and with porosity of about 50% by volume or less.

Figure 2:
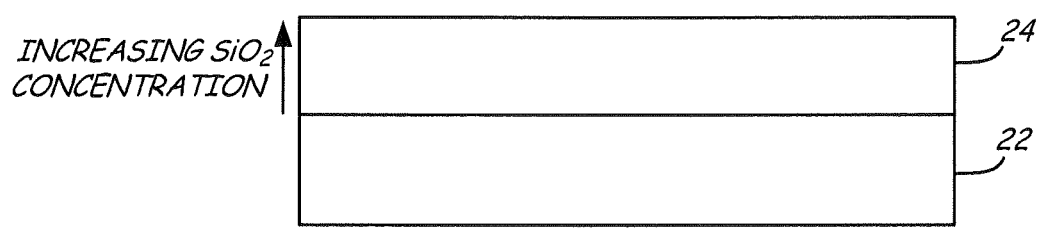
FIG. 2 is a schematic diagram of a mixed structure having a graded mixture.

In another embodiment, photocatalyst particles and silica particles are mixed together and applied to a substrate in a graded mixture as illustrated in FIG. 2. In a graded mixture, the concentration of silica particles may be gradually increased as a function of distance from substrate 22. For example, catalytic layer 24 may contain no silica particles at the interface with substrate 22 and the amount of silica particles may be gradually increased so that surface of catalyst coating 24 opposite substrate 22 contains silica particles and porosity and no photocatalyst particles.

Figure 3:
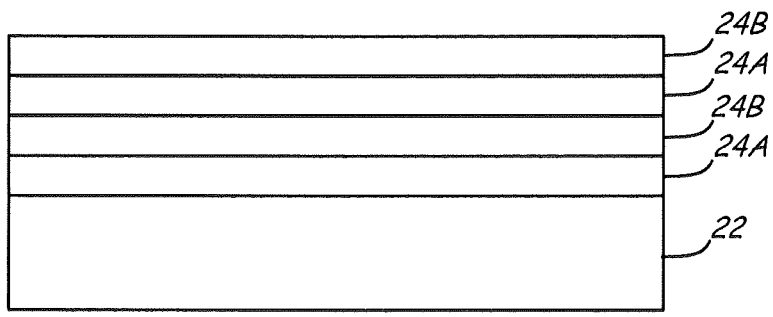
FIG. 3 is a schematic diagram of a mixed structure having alternating layers.

In another embodiment, as illustrated in FIG. 3, photocatalyst particle layers 24A and silica particle layers 24B are alternatively applied to substrate 22. At least a total of three layers are applied to substrate 22. Either silica particle layer 24B or photocatalyst particle layer 24A may be immediately adjacent substrate 22 so long as silica particle layer 24B is on the surface opposite substrate 22. The layers may have the same or different thicknesses or a combination thereof. However, the thickness of each silica particle layer 24B should be thin enough for light to penetrate through the silica particles and reach the photocatalyst particles. This thickness depends on the particle sizes and the degree of agglomeration in silica particle layer 24B. In one example, each silica particle layer may be between about 5 nm and about 60 nm thick.

Several different techniques may be used to apply catalyst coating 24 to substrate 22. In one example, a slurry of particles is formed by mixing particles with water or an organic solvent to form an aqueous suspension having about 1-20 wt % solids. The slurry is applied to substrate 22 by spraying, dip coating, or other applications. The solvent evaporates, leaving a layer of particles. The type of particles present in the slurry depends on the desired composition of the deposited layer. In one example, photocatalyst particles and silica particles are mixed into the slurry to form a mixed layer of photocatalyst particles and silica particles with a uniform silica and photocatalyst ratio. In another example, photocatalyst particles are mixed into a slurry to form photocatalyst particle layer 24A and silica particles are mixed into a different slurry to from silica particle layer 24B.

Figure 4:
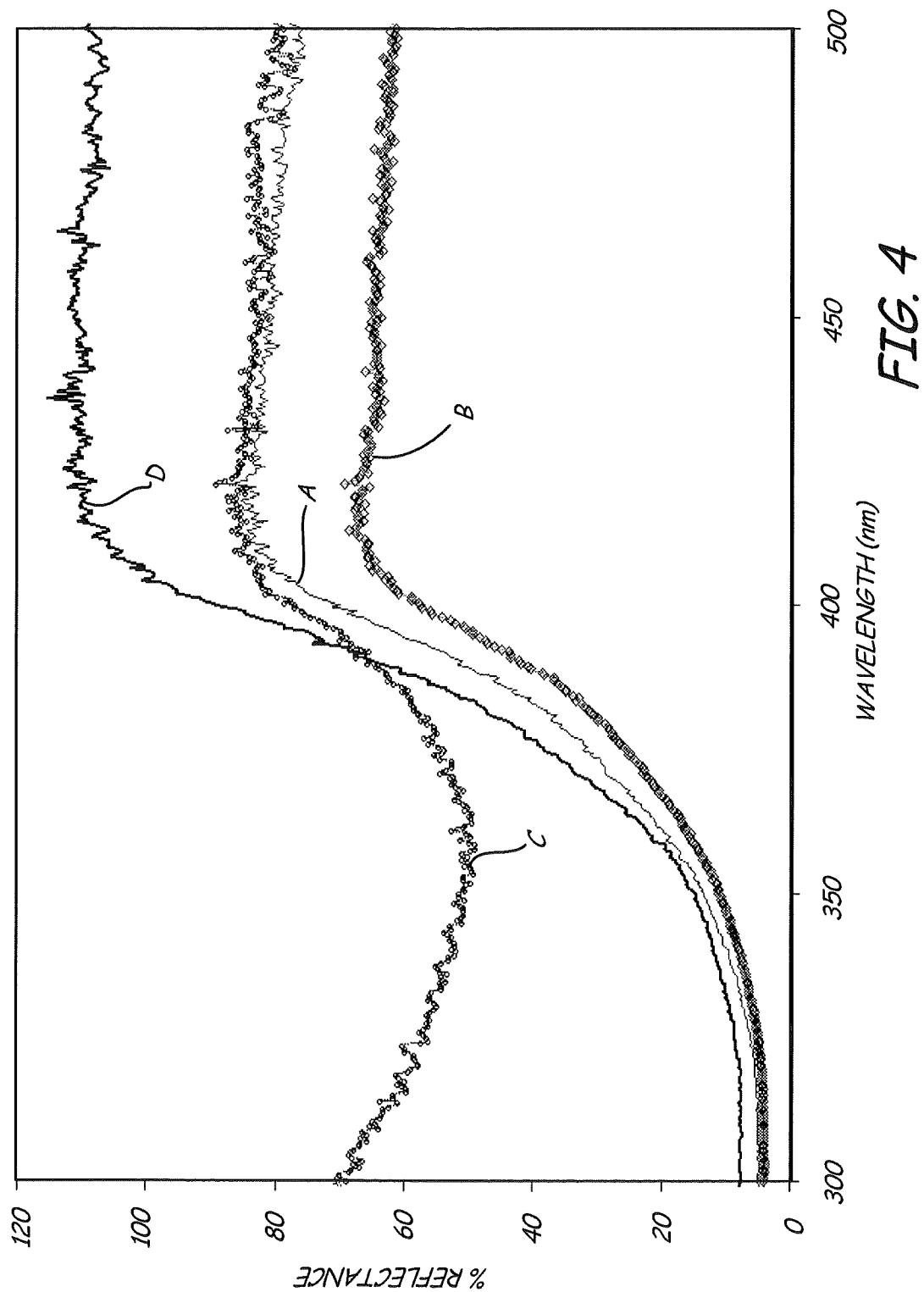
FIG. 4 is a graph illustrating the percent reflectance of incident light for different silica layered coatings as a function of wavelength in nanometers of the incident light.

FIG. 4 shows a graph of the percent reflectance of titanium dioxide samples having various silica particle coatings versus the wavelength in nanometers of the incident light on the sample. For curves A-C about 25 mg of Degussa P25 titanium dioxide photocatalyst was coated onto an aluminum slide. The silica particle coating was varied for each sample.

For curve A, about 25 mg of Degussa P25 titanium dioxide photocatalyst was coated onto an aluminum slide. No silica coating was applied to the titanium dioxide. Curve A has a UV absorbance of about 390 nm and a reflectance of about 80%.

For curve B, approximately 2 mg of silica (Alfa Aesa, 350 m$^2$/g) was coated on top of about 25 mg of Degussa P25 titanium dioxide photocatalyst. Curve B has a UV absorbance of about 390 nm (which is about the same as curve A) and a reflectance of about 60%. The decrease in reflectance as compared to curve A may be due to competition between photon reflectance of the larger silica particles and photon absorbance of the titanium dioxide particles. At this relative low loading of silica, the UV reflectance trace suggests that the photon absorbance is reduced compared to the absorbance of pure Degussa P25 titanium dioxide photocatalyst.

For curve C, about 25 mg of Degussa P25 titanium dioxide photocatalyst was coated with a layer of silica (Alfa Aesa, 350 m$^2$/g) so that about a 65 mg total loading was obtained. The UV absorbance of curve C is comparable to curve A and curve B at about 390 nm. Curves A, B and C show that the UV absorbance of titanium dioxide having a silica overlayer is controlled by the coating of titanium dioxide. That is, silica has essentially no UV absorbance, and the sole UV absorbance of the sample is that of the titanium dioxide layer. The reflectance of the upper right side the UV trace of curve C is about 80% while the lower left UV trace of curve C is greater than 50%. In contrast, curves A and B have a lower left reflectance trace of less than 10%. Curve C has an increased reflectance because silica does not absorb in the UV range and the high silica loading has prevented the UV light from reaching the titanium dioxide layer. As more silica is added to the slide, less UV light reaches the titanium dioxide layer and more UV light is reflected. Eventually, a limit is reached where the output of the UV reflectance experiment would be a straight line with an overall reflectance of about 80%.

Curve D illustrates the benefits of alternating photocatalyst particle layers and silica particle layers. In curve D, alternating layers of about 10 mg of Degussa P25 titanium dioxide photocatalyst and about 2 mg of silica (Alfa Aesa, 350 m$^2$/g) were coated onto an aluminum slide so that the total loading was about 65 mg. Curve D has a UV absorbance at about 375 nm and a reflectance of greater than 100%. An increased magnitude in reflectance correlates with an increased absorbance resulting in an increased number of photons available for photochemical activity. The increase in reflectance to greater than 100% in the presence of the strong absorption by the titanium dioxide indicates that the Degussa P25/silica coating is optically dense. That is, photons from the UV light are absorbing into the layers of titanium dioxide particles. Any UV light that is not absorbed during the initial penetration will be reflected and scattered, and the likelihood of continued absorption with titanium dioxide particles can continue with small silica particles acting as photon transmitters. As discussed above, silica has no UV absorption, therefore curve D illustrates the enhancement of the absorption of titanium dioxide.

Although the present invention has been described with reference to preferred embodiments, workers skilled in the art will recognize that changes may be made in form and detail without departing from the spirit and scope of the invention.

The invention claimed is:

1. An air purification system comprising:
    an inlet;
    an outlet;
    a photocatalyst device for reacting with organic compounds, the photocatalyst device having a mixed structure of photocatalyst particles and silica particles supported on a substrate, wherein the mixed structure comprises at least three alternating layers of photocatalyst particles and silica particles; and
    a UV source for providing UV illumination of the photo catalytic device.

2. The system of claim 1 wherein the mixed structure includes a layer of silica particles adjacent to the substrate and a layer of silica particles on an outer surface of the mixed structure.

3. The system of claim 1 wherein the layers of silica particles have a thickness between about 5 nm and about 60 nm.

4. The system of claim 1, wherein the mixed structure includes a layer of photocatalyst particles adjacent to the substrate and a layer of silica particles an outer surface of the mixed structure.

5. The system of claim 1, wherein the silica particles are small enough that UV light from the UV source will penetrate through the particles and reach the photocatalyst particles.

\* \* \* \* \*